(12) United States Patent
Sun et al.

(10) Patent No.: US 8,705,482 B2
(45) Date of Patent: Apr. 22, 2014

(54) METHOD AND DEVICE FOR REPORTING CHANNEL STATE INFORMATION

(76) Inventors: Shaohui Sun, Beijing (CN); Xin Su, Beijing (CN); Deshan Miu, Beijing (CN); Ranran Zhang, Beijing (CN); Meifang Jing, Beijing (CN); Qiubin Gao, Beijing (CN); Guojun Xiao, Beijing (CN); Rakesh Tamrakar, Beijing (CN)

(*) Notice: Subject to any disclaimer, the term of this patent is extended or adjusted under 35 U.S.C. 154(b) by 0 days.

(21) Appl. No.: 13/704,229

(22) PCT Filed: Apr. 27, 2011

(86) PCT No.: PCT/CN2011/073401
§ 371 (c)(1),
(2), (4) Date: Apr. 9, 2013

(87) PCT Pub. No.: WO2011/137726
PCT Pub. Date: Nov. 10, 2011

(65) Prior Publication Data
US 2013/0215841 A1 Aug. 22, 2013

(30) Foreign Application Priority Data
May 7, 2010 (CN) .......................... 2010 1 0171368

(51) Int. Cl.
H04W 4/00 (2009.01)
(52) U.S. Cl.
USPC .......................................................... 370/329
(58) Field of Classification Search
None
See application file for complete search history.

(56) References Cited

U.S. PATENT DOCUMENTS

| 8,045,508 | B2* | 10/2011 | Lee et al. | 370/328 |
| 8,050,227 | B2* | 11/2011 | Lee et al. | 370/329 |
| 8,335,466 | B2* | 12/2012 | Cai et al. | 455/7 |
| 8,358,585 | B2* | 1/2013 | Chung et al. | 370/252 |
| 8,374,136 | B2* | 2/2013 | Yin | 370/329 |
| 8,379,588 | B2* | 2/2013 | Lee et al. | 370/329 |

(Continued)

FOREIGN PATENT DOCUMENTS

| CN | 101426225 A | 5/2009 |
| CN | 101610523 A | 12/2009 |
| CN | 101615984 A | 12/2009 |
| CN | 101677261 A | 3/2010 |

OTHER PUBLICATIONS

ISR for related PCT/CN2011/073401 mailed on Aug. 11, 2011.
WO for PCT/CN2011/073401 completed on Jul. 27, 2011.

*Primary Examiner* — Clemence Han
(74) *Attorney, Agent, or Firm* — Ladas & Parry, LLP

(57) ABSTRACT

The present invention discloses a method and device of reporting channel state information, including: user terminal selects the codebook used in reporting precoding matrix indicator (PMI) from double-stage codebook and selects PMI from the codebook; double-stage codebook involves codebook reflecting long-term/broadband information and that reflecting short-term/frequency selective channel information; and user terminal calculates channel quality indication; therein, when reporting through physical uplink control channel (PUCCH), the parameter used in calculating channel quality indication (CQI) includes the precoding matrix indicator (PMI) reported by user terminal through physical uplink shared channel (PUSCH); when reporting through physical uplink shared channel (PUSCH), the parameter used in calculating CQI includes the precoding matrix indicator (PMI) reported by user terminal through physical uplink control channel (PUCCH); user terminal selects the PMI and calculates CQI according to the specified reporting mode and reporting RI. The present invention can realize double-stage feedback by using the present feedback channel.

12 Claims, 2 Drawing Sheets

(56) References Cited

U.S. PATENT DOCUMENTS

| | | | |
|---|---|---|---|
| 8,412,209 B2 * | 4/2013 | Whinnett et al. | 455/450 |
| 8,472,991 B2 * | 6/2013 | Pelletier et al. | 455/517 |
| 8,514,796 B2 * | 8/2013 | Kowalski et al. | 370/329 |
| 8,526,347 B2 * | 9/2013 | Wang et al. | 370/311 |
| 8,553,627 B2 * | 10/2013 | Yin et al. | 370/329 |
| 8,559,328 B2 * | 10/2013 | Tan et al. | 370/252 |
| 2009/0059844 A1 | 3/2009 | Ko et al. | |
| 2009/0168718 A1 | 7/2009 | Wang et al. | |

* cited by examiner

METHOD AND DEVICE FOR REPORTING CHANNEL STATE INFORMATION

CROSS REFERENCE TO RELATED APPLICATIONS

This application is the U.S. national stage of international patent application no. PCT/CN2011/073401 filed on Apr. 27, 2011, which claims priority to Chinese patent application no. 201010171368.6 entitled "A method and device for reporting channel state information" filed in the patent office of the People's Republic of China on May 7, 2010, the disclosures of which are incorporated by reference herein in their entireties.

FIELD OF THE INVENTION

The present invention relates to the field of wireless communication, in particularly to a method and device for reporting channel state information.

BACKGROUND OF THE INVENTION

In point-to-point communication, if the transmitter is capable of acquiring certain Channel State Information (CSI), it can optimize the spatial distribution character of modulation mode, code rate and signal power of sending signal, make the sending signal match with channel transmission character, thus realizing the effects of enhancing the reliability of signal reception and reducing requirements of receiver algorithm complexity. In multi-user system, the transmitter can perform scheduling judgment according to acquired CSI, so as to improve the efficiency of system frequency spectrum and avoid the interference among cells.

In LTE (Long-Term Evolution) Rel-8/9, eNB can acquire CSI of downlink channel by using channel reciprocity or UE (User Equipment) feedback; therein, several main transmission modes of PDSCH (Physical Downlink Shared Channel) all adopt implicit CSI feedback method based on codebook. In transmission mode 4, 5 and 6 (as well as PMI (Precoding matrix indication) report mode of transmission mode 8), UE measures downlink channel based on CRS (Cell-specific Reference Signal), reports the number of data stream supported by down link (Rank Indication (RI)) and PMI (Precoding matrix indicator) to eNB according to its own receiving process algorithm, and then reports the Channel Quality Indication (CQI) of each codeword. Therein, UE supposes eNB has used the recommended RI/PMI during the computation process of CQI.

Codebook-based precoding scheme adopted in LTE Rel-8/9 mainly lays emphasis on single-user application scene, while in Rel-10 (LTE-A, viz. LTE-Advanced), precoding and its feedback mechanism will be further optimized to better support multi-user scene. According to current discussion results, LTE-A has the basic requirements for feedback enhancing scheme: try to improve CSI feedback accuracy on the premise of keeping lower feedback overheads. In the aforementioned context, it is basically determined at present that feedback scheme based on double codebook will be adopted in Rel-10. In the scheme, channel information will be divided into two parts: rather stable long-term/broadband CSI and short-term/frequency selective CSI with relative high time/frequency selectivity. UE can quantify the above CSIs by two codebooks in accordance with different feedback cycles, with corresponding PMI fed back. Therein, feeding back PMI-1 of long-term/broadband CSI possesses higher spatial resolution, but it can be fed back in greater cycle and larger bandwidth. PMI-2 is used to reflect the fast part of CSI, which could be in the unit of subband and fed back in lower cycle. As the equivalent channel matrix formed by channel combining with PMI-1 may have lower dimensionality, generally PMI-2 only needs to quantify the CSI with lower dimensionality, thus few bit of PMI-2.

In the present version (Rel-8/9) of LTE, higher layer can configure UE to perform periodical report by adopting PUCCH (Physical uplink Control Channel) and/or aperiodic report by PUSCH (Physical Uplink Shared Channel). According to present specifications and the Way forward reached in current LTE-A discussion, the report contents and processes of PUCCH and PUSCH shall be totally independent. Table 1 and Table 2 show the report modes in present specifications based on PUCCH and PUSCH respectively. Among them, PUCCH report mode refers to the combination of PUCCH report type, with the correspondence shown in Table 3.

TABLE 1

PUCCH-based Report Mode

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

TABLE 2

PUSCH-based Report Mode

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

TABLE 3

Report Type and Bit Number Included in Each PUCCH Reporting Mode

| PUCCH Report Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 4 + L | NA | 4 + L |
|   |   | RI > 1 | NA | 7 + L | NA | 4 + L |
| 2 | Wideband CQI/PMI | 2 TX Antennas RI = 1 | 6 | 6 | NA | NA |
|   |   | 4 TX Antennas RI = 1 | 8 | 8 | NA | NA |
|   |   | 2 TX Antennas RI > 1 | 8 | 8 | NA | NA |
|   |   | 4 TX Antennas RI > 1 | 11 | 11 | NA | NA |
| 3 | RI | 2-layer spatial multiplexing | 1 | 1 | 1 | 1 |
|   |   | 4-layer spatial multiplexing | 2 | 2 | 2 | 2 |
| 4 | Wideband CQI | RI = 1 or RI > 1 | NA | NA | 4 | 4 |

In course of implementing the present invention, the inventor finds out there are at least the defects below in the present technology:

On one hand, the present feedback mechanism fails to realize double-stage feedback; on the other hand, the report contents and processes of PUCCH and PUSCH shall be totally independent in the present feedback mechanism, but actually the information provided by the two report paths may have some redundancy. If double codebook feedback is supported simultaneously in PUCCH and PUSCH, it is inevitable to increase new reporting mode. Besides, feedback overheads may be increased if double-stage feedback is to be independently supported in PUCCH and PUSCH.

SUMMARY OF THE INVENTION

The embodiments of the present invention provides a method and device for reporting channel state information, which is used to report channel state information through PUCCH and PUSCH based on double-stage codebook.

Methods for reporting channel state information provided in the embodiments of the present invention, including:

User terminal selects the codebook used during PMI (precoding matrix indication) reporting from a double-stage codebook, and selects PMI from the selected codebook; said double-stage codebook includes the codebook reflecting long-term/broadband information and the codebook reflecting short-term/selective channel frequency information;

Said user terminal determines the parameter used during CQI (channel quality indication) calculation and calculates CQI based on this parameter; the determined parameter used during CQI calculation through PUCCH reporting involves PMI reported by said user terminal through PUSCH; during reporting through PUSCH, the determined parameter used for CQI calculation includes PMI reported by said user terminal through PUCCH;

Said user terminal reports RI, the selected PMI and calculated CQI according to the specified reporting mode.

Terminal unit provided by the embodiments of the present invention includes:

PMI selection cell, which is used to select the codebook used during PMI reporting from a double-stage codebook, and select PMI from this codebook; said double-stage codebook includes the codebook reflecting long-term/broadband information and the codebook displaying short-term/selective channel frequency information;

CQI calculation cell, which is used to determine the parameter during CQI calculation and calculate CQI based on this parameter; the determined parameter used during CQI calculation through PUCCH reporting involves PMI reported by said user terminal through PUSCH; during reporting through PUSCH, the determined parameter used for CQI calculation includes PMI reported by said user terminal through PUCCH;

Reporting cell, which is used to report RI, PMI selected by said PMI selected cell and CQI calculated by said CQI calculation cell based on the specified reporting mode.

For the above embodiments of the present invention, on one hand, through the set double-level codebook and said double-level codebook including codebook reflecting long-term/broadband information and that reflecting short-term/frequency selective channel information, user terminal can select corresponding codebook and further select corresponding PMI according to reporting mode, thus adapting to the requirements for PUCCH and PUSCH reporting channel state information; on the other hand, when calculating CQI, combine the reporting mechanism of PUCCH with that of PUSCH, to realize reporting of channel state information through present PUCCH and PUSCH reporting mechanism without extra overheads increased.

DETAILED DESCRIPTION OF PREFERRED EMBODIMENTS

Figure 1:
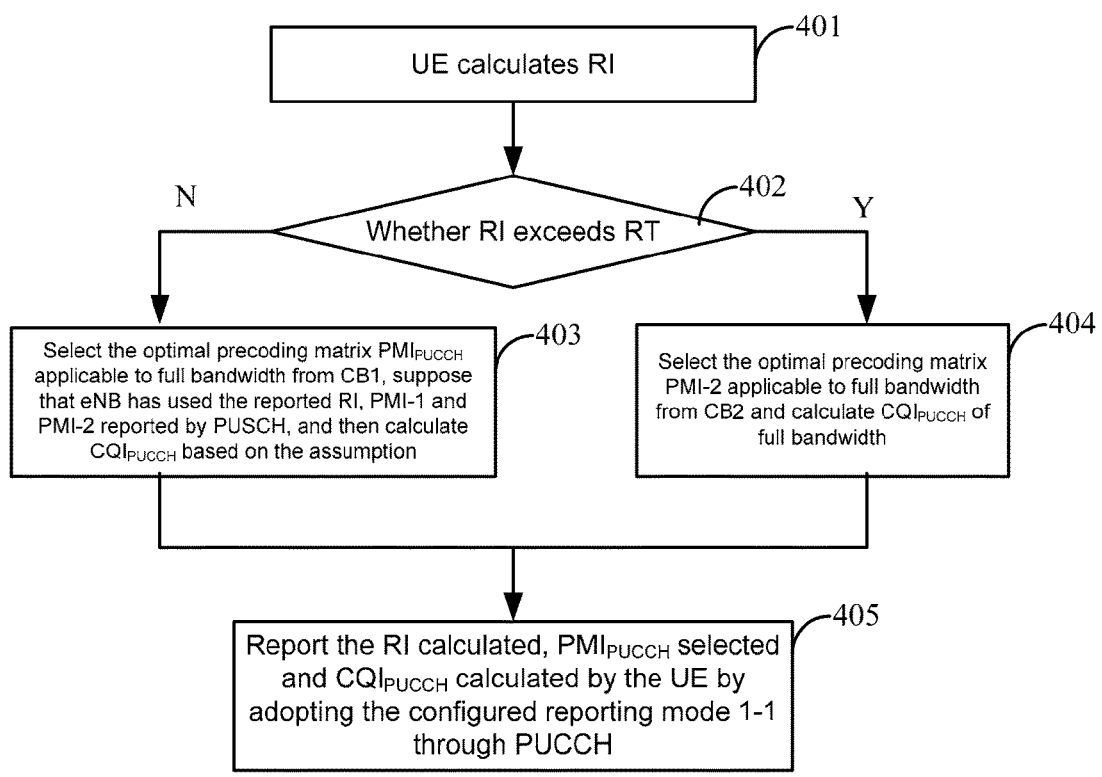
FIG. 1 is a flow diagram of reporting channel state information based on PUCCH in the embodiments of the present invention.

The embodiments of the present invention provides a scheme for reporting channel state information, which is applicable to the precoding process that adopts double-stage codebook. In the scheme, UE can report RI, long-term/broadband PMI and corresponding CQI information to eNB through PUCCH, and report short-term/frequency selective PMI and corresponding CQI information of several subbands to eNB by combining PUSCH.

The technical solutions in the present invention are explained in a clear and complete way with reference to the drawings in the present invention. Obviously, the embodiments described hereinbelow are only a plurality of embodiments of the present invention rather than all. All other embodiments gained by those skilled in the art on the basis of the embodiments in the present invention without any creative work shall fall within the protection scope of the present invention.

The double-stage codebooks in the embodiments of the present invention refer to the codebook reflecting long-term/broadband information and that reflecting short-term/frequency selective channel information. Said codebook refers to the assembly composed of limited number of predefined precoding matrixes. For easy description, the embodiments of the present invention record the codebooks reflecting long-term/broadband information as CB1 while those reflecting short-term/frequency selective channel information as CB2. Feedback enhancement is mainly applied in MU-MIMO (MultipleUsers-Multiple Input Multiple Output) scene (low rank), as an example The double-stage codebook structure can be presented as:

In case of $RI \leq R_T$, the dimensionality of PMI-1 is $N_r \times R_T$, while that of PMI-2 refers to $R_T \times RI$ (wherein, $N_r$ refers to the number of transmitting antenna of eNB, and $R_T$ is the predefined threshold which can be determined corresponding to rank number of MU-MIMO);

In case of $RI > R_T$, PMI-1 is fixed as $N_T \times N_T$ (written as $I_{N_r}$), while the dimensionality of PMI-2 is $N_T \times RI$ (wherein, $N_T$ refers to the number of transmitting antenna of eNB, and $R_T$ is the predefined threshold which can be determined corresponding to rank number of MU-MIMO).

In the embodiments of the present invention, the reporting of channel information can be divided into two parts: PUCCH reporting and PUSCH reporting, between which there is certain dependence, with details as follows:

In the process of reporting channel state information based on PUCCH, UE can instruct $CQI_{PUCCH}$ through PUCCH reporting mode 1-1, 2-1 reporting RI, $PMI_{PUCCH}$ and corresponding channel quality in accordance with the cycle of higher layer configuration and time sequence offset. Therein, the definition of $PMI_{PUCCH}$ and computing mode of $CQI_{PUCCH}$ can be presented as:

In case of $RI \leq R_T$, UE will select the precoding matrix $PMI_{PUCCH}$=PMI-1∈CB1 applicable to wide band from CB1 according to downlink channel conditions and detection algorithm. During implementation, the $PMI_{PUCCH}$ is the optimal precoding matrix which refers to the one that can create the highest downlink transmission rate in the application. UE side can calculate the transmission rate that can be obtained in the codebook used in case of each precoding matrix, then judge the optimal precoding matrix in accordance with the rate available. UE will calculate $CQI_{PUCCH}$=CQI(RI,PMI-1, PMI-2) and then report under the circumstance of supposing eNB has used the reported RI, PMI-1 and PMI-2 (reported by PUSCH);

In case of $RI > R_T$, UE will select the precoding matrix $PMI_{PUCCH=PMI}$-2∈CB2 applicable to wide band from CB2 according to downlink channel conditions and detection algorithm. During implementation, the $PMI_{PUCCH}$ is the optimal precoding matrix. UE will calculate $CQI_{PUCCH}$=CQI(RI, $I_{N_r}$, PMI-2) and then report under the circumstance of supposing eNB has used the recommended RI and PMI-2.

During the process of reporting channel state information based on PUSCH, UE can instruct $CQI_{PUSCH}$ through PUSCH reporting mode3-1, 1-2 and 2-2 reporting RI, $PMI_{PUSCH}$ and corresponding channel quality in accordance with the cycle of higher layer configuration and time sequence offset. Therein, the definition of $PMI_{PUSCH}$ and computing mode of $CQI_{PUSCH}$ can be presented as:

In case of $RI \leq R_T$, UE will select precoding matrix $PMI_{PUSCH}$=PMI-2∈CB2 from CB2 for each frequency domain subset (according to reporting mode, frequency domain subset may be broadband or subband) in accordance with downlink channel conditions, detection algorithm and PUSCH reporting mode of higher layer configuration. During implementation, the $PMI_{PUSCH}$ refers to optimal precoding matrix. UE will calculate $CQI_{PUSCH}$=CQI(RI,PMI-1,PMI-2) and then report under the circumstance of supposing eNB has used the reported RI, PMI-1 (reported by PUCCH) and PMI-2.

In case of $RI > R_T$, UE will select precoding matrix $PMI_{PUSCH}$=PMI-2∈CB2 for reporting cell of each frequency domain subset (according to reporting mode, reporting cell may be broadband or subband) in accordance with downlink channel conditions, detection algorithm and PUSCH reporting mode of higher layer configuration. During implementation, the $PMI_{PUSCH}$ refers to optimal precoding matrix. UE will calculate $CQI_{PUCCH=CQI}$(RI, $I_{N_r}$,PMI-2) and then report under the circumstance of supposing eNB has used the recommended RI and PMI-2.

During the aforesaid process of reporting information based on PUCCH and that based on PUSCH, function CQI (x,y,z) means that UE supposes the rank of channel to be x, while eNB uses the combined precoding matrix PM=G(PMI-1, PMI-2) corresponding to PMI-1=y and PMI-2=z. Function G( ) represents the function of precoding matrix combined by double-stage PMI. Therein, function G( ) can be realized by adopting the present algorithm or others, such as G(x, y)=x*y.

Then, the process of reporting channel state information based on PUCCH and that based on PUSCH will be described respectively by taking PUCCH reporting mode 1-1 and PUSCH reporting mode 1-2 adopted by higher layer configuration UE in combination with FIG. 1 and FIG. 2.

As shown in FIG. 1, the process of reporting channel state information based on PUCCH can be presented as:

Step 401: UE calculates RI.

In this step, UE can measure downlink channel based on CRS and/or CSI-RS, and calculate the quantity of data flow (RI) supported by downlink of this UE by measured performance parameter of downlink channel according to its own calculation of reception and processing.

Step 402: UE judges whether the calculated RI exceeds $R_T$, if not, implement step 403; if does, implement step 404.

Step 403: When it is judged to be $RI \leq R_T$, UE will select the optimal precoding matrix $PMI_{PUCCH}$=PMI-1∈CB1 applicable to wide band from CB1 according to downlink channel conditions and detection algorithm. Moreover, the UE supposes eNB has used the reported RI, PMI-1 and PMI-2 (reported by PUSCH) and calculate $CQI_{PUCCH}$=CQI(RI,PMI-1,PMI-2) of wide band based on the aforesaid assumption, then enter step 405.

Step 404: In case of $RI > R_T$, UE will select the optimal precoding matrix PMI-2 applicable to wide band from CB2 according to downlink channel conditions and detection algorithm, and calculate $CQI_{PUCCH}$=CQI(RI, $I_{N_r}$,PMI-2) of wide band, then enter step 405.

Step 405: UE reports channel state information by adopting the configured reporting mode 1-1 through PUCCH in accordance with the cycle of higher layer configuration and time sequence offset, including: RI calculated by UE, $PMI_{PUCCH}$ selected and $CQI_{PUCCH}$ calculated by UE.

Figure 2:
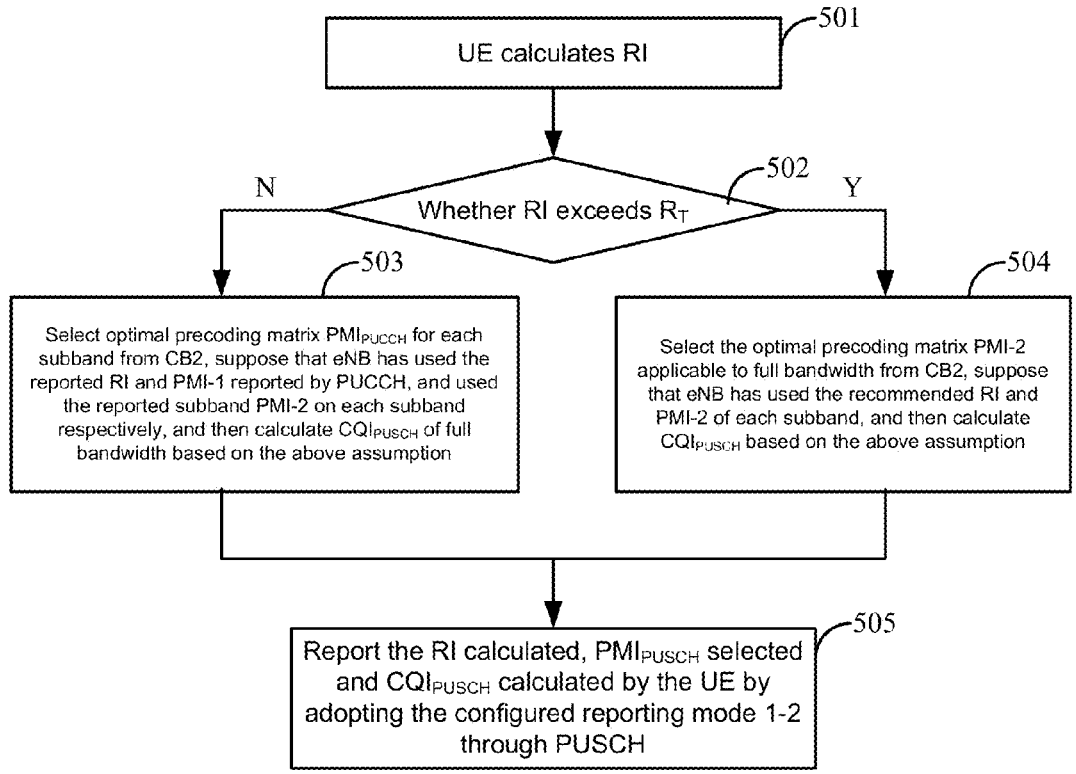
FIG. 2 is a flow diagram of reporting channel state information based on PUSCH in the embodiments of the present invention.

As shown in FIG. 2, the process of reporting channel state information based on PUSCH can be presented as:

Step 501: UE calculates RI.

In this step, UE can measure downlink channel based on CRS and/or CSI-RS, and calculate the quantity of data flow (RI) supported by downlink of this UE by measured performance parameter of downlink channel according to its own calculation of reception and processing.

Step 502: UE judges whether the calculated RI exceeds $R_T$, if not, implement step 503; if does, implement step 504.

Step 503: When it is judged as RI≤$R_T$, UE will select the optimal precoding matrix $PMI_{PUSCH}$=PMI-2∈CB2 for each subband from CB2 according to downlink channel conditions and detection algorithm. Moreover, the UE supposes eNB has used the reported RI and PMI-1 (reported by PUCCH) on wide band and the reported subband PMI-2 on each subband respectively, and calculate $CQI_{PUSCH}$=CQI(RI,PMI-1,PMI-2) of wide band based on the aforesaid assumption, then enter step 505.

Step 504: In case of RI>$R_T$, UE will select the optimal precoding matrix $PMI_{PUSCH}$=PMI-2∈CB2 for each subband according to downlink channel conditions and detection algorithm. Moreover, UE supposes eNB has used the recommended RI and PMI-2 of each subband on wide band, and calculate $CQI_{PUSCH}$=CQI(RI, $I_{N_r}$,PMI-2) on wide band based on the aforesaid assumption, then enter step 505.

Step 505: UE reports channel state information by adopting the configured reporting mode 1-2 through PUSCH in accordance with the cycle of higher layer configuration and time sequence offset, including: RI calculated by UE, $PMI_{PUSCH}$ selected and $CQI_{PUSCH}$ calculated by UE.

In another embodiment of the present invention, $R_T$ cannot be preset in advance (or set maximum $R_T$ to make RI always satisfy RI≤$R_T$) so that user terminal can directly select PMI from CB1 when reporting channel state information through PUCCH and adopt PMI reported by PUSCH as one parameter when calculating CQI instead of comparing RI with $R_T$; in the same way, directly select PMI from CB2 when reporting channel state information through PUSCH and adopt PMI reported by PUCCH as one parameter when calculating CQI. The processing of corresponding steps will not be described here for it is similar to those in FIG. 1 and FIG. 2.

During implementation, set $R_T$ to be adjustable to increase flexibility. This function can be omitted in practice for the purpose of relative simple system design.

It can be seen from the above description that in the embodiments of the present invention, double-stage feedback is realized by using the present feedback channel (PUCCH and PUSCH). Therein, the reporting contents of PUCCH and PUSCH supplement each other, thus reducing information redundancy. Moreover, extra report type and reporting mode are not necessary in the embodiments of the present invention, so little influence has been posed on reporting mechanism of the present channel state information, without extra signaling overheads increased.

Based on the same technical consideration, the embodiments of the present invention also provide a terminal unit.

Figure 3:
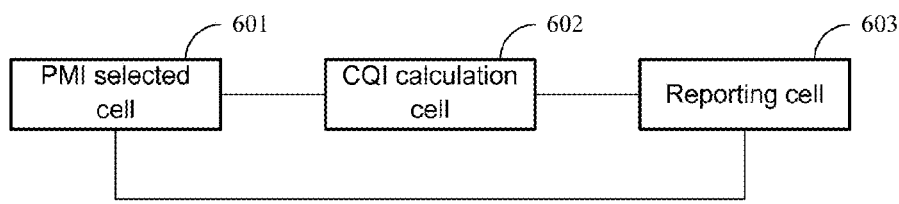
FIG. 3 is a structure diagram of terminal unit provided by the embodiments of the present invention.

As shown in FIG. 3, the terminal units provided by the embodiments of the present invention can be applied in the process of reporting channel state information through PUCCH and PUSCH, including: PMI selected cell 601, CQI calculation cell 602 and reporting cell 603, therein:

PMI selected cell 601, which is applicable to select the codebook used in reporting precoding matrix indicator (PMI) from double-stage codebook, and select PMI from the codebook; said double-stage codebook includes codebook reflecting long-term/broadband information and that reflecting short-term/frequency selective channel information;

CQI calculation cell 602, which is applicable to determine the parameter used in calculating channel quality indication (CQI), and calculate CQI accordingly; therein, when reporting through PUCCH, the determined parameter to be used in calculating CQI includes the PMI reported by said user terminal through PUSCH; when reporting through PUSCH, the determined parameter to be used in calculating CQI includes the PMI reported by said user terminal through PUCCH;

Reporting cell 603, which is applicable to report said RI, PMI selected by PMI selected cell 601 and CQI calculated by CQI calculation cell 602 in accordance with the specified reporting mode.

For the process of reporting channel state information through PUCCH, PMI selected cell 601 in the above user terminal device selects the codebook reflecting long-term/broadband information, and selects the PMI corresponding to precoding matrix applicable to wide band from the selected codebooks; for the process of reporting channel state information through PUCCH, the cell selects the codebook reflecting short-term/frequency selective channel information, and selects PMI corresponding to precoding matrix for reporting cell of each frequency domain subset from the codebook.

When reporting through PUCCH, PMI selected cell 601 can judge whether said RI exceeds the set threshold $R_T$; if not, select the codebook reflecting long-term/broadband information and select the PMI corresponding to precoding matrix applicable to wide band from the codebook. Meanwhile, the cell can also select the codebook reflecting short-term/frequency selective channel information and select the PMI corresponding to precoding matrix applicable to wide band from the codebook when judging whether said RI exceeds $R_T$.

When reporting through PUCCH, CQI calculation cell 602 of the above user terminal can judge whether RI exceeds the set threshold $R_T$; if not, the parameters used in calculating CQI include: said RI, PMI selected by said user terminal and PMI reported by said user terminal through PUSCH. If does, the parameters used in calculating CQI determined by the cell include: said RI, PMI selected by said user terminal and a fixed parameter; the parameter refers to $N_T \times N_T$, wherein $N_T$ means the number of transmitting antenna of eNB.

When reporting through PUSCH, CQI calculation cell 602 of the above user terminal can judge whether RI exceeds the set threshold $R_T$; if not, the parameters used in calculating CQI include: said RI, PMI selected by said user terminal and PMI reported by said user terminal through PUCCH. If does, the parameters used in calculating CQI determined by the cell include: said RI, PMI selected by said user terminal and a fixed parameter; the parameter refers to $N_T \times N_T$, wherein $N_T$ means the number of transmitting antenna of eNB.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several instructions to enable a computer unit (such as personal computer, sever, or network equipment, etc.) to implement the methods described in all embodiments of the present invention.

Technical personnel of the field can understand that the drawings only refer to the diagram of a preferred embodiment, and the module or procedure is not necessary for the implementation of the embodiments of the present invention.

Technical personnel of the field can understand that the module of the unit of an embodiment can be distributed in such unit according to embodiment description, or located in one or more units of another embodiment through corresponding changes. Modules of the embodiments mentioned above can be merged into one module, or further divided into multi-submodules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

The invention claimed is:

1. A method of reporting channel state information is characterized in that which comprises:
    User terminal selects the codebook used during PMI (precoding matrix indication) reporting from a second-stage codebook, and selects PMI from this codebook; said double-stage codebook includes the codebook reflecting long-termlbroadband information and the codebook reflecting short-term/ selective channel frequency information;
    Said user terminal determines the parameter used during CQI (channel quality indication) calculation and calculates CQI based on this parameter; the determined parameter used during CQI calculation through PUCCH reporting involves PMI reported by said user terminal through PUSCH; during reporting through PUSCH, the determined parameter used for CQI calculation includes PMI reported by said user terminal through PUCCH;
    Said user terminal reports rank indication (RI), the selected PMI and calculated CQI according to the specified reporting mode.

2. The method as claimed in claim 1, wherein, during reporting through PUCCH, codebook selected by said user terminal refers to that reflecting long-term/broadband information and the selected PMI is that corresponding to precoding matrix applicable to wide band;
    And/or, during reporting through PUSCH, codebook selected by said user terminal refers to that reflecting short-term / frequency selective channel information and the selected PMI includes the PMI corresponding to precoding matrix selected for reporting cell of each frequency domain subset.

3. The method as claimed in claim 2, wherein, before selecting codebook, it also includes: said user terminal judges whether said RI exceeds the set threshold $R_T$;
    When reporting through PUCCH, said user terminal selects the codebook used in reporting PMI from double-stage codebook and selects PMI from the codebook, comprising:
    If said RI fails to exceed $R_T$, select the codebook reflecting long-term / broadband information and the PMI corresponding to precoding matrix applicable to wide band from the codebook;
    If said RI does exceed $R_T$, select the codebook reflecting short-term/frequency selective channel information and the PMI corresponding to precoding matrix applicable to wide band from the codebook;
    And/or,
    When reporting through PUSCH, if said RI fails to exceed the set threshold $R_T$, the dimensionality of the selected precoding matrix is Rt×RI; if it does, the dimensionality of the selected precoding matrix is $N_T$×RI, wherein, $N_T$ refers to the number of transmitting antenna of eNB.

4. The method as claimed in claim 3, wherein, if said RI fails to exceed $R_T$, the dimensionality of the selected precoding matrix is $N_T$×$R_T$, wherein $N_T$ refers to the number of transmitting antenna of eNB.

5. The method as claimed in claim 3, wherein, if said RI exceeds $R_T$, the dimensionality of the selected precoding matrix is $N_T$×RI ; wherein $N_T$ refers to the number of transmitting antenna of eNB.

6. The method as claimed in claim 1, wherein, before determining the parameter used in calculating CQI, it also includes: said user terminal judges whether said RI exceeds the set threshold $R_T$;
    When reporting through PUCCH, said user terminal determines the parameter used in calculating CQI, comprising:
    If said RI fails to exceed $R_T$, the parameters used in calculating CQI include: said RI, PMI selected by said user terminal and PMI reported by said user terminal through PUSCH;
    If said RI exceeds $R_T$, the parameters used in calculating CQI include: said RI, PMI selected by said user terminal and a fixed parameter; the parameter refers to $N_T$×$N_T$, wherein $N_T$ means the number of transmitting antenna of eNB;
    And/or,
    When reporting through PUSCH, said user terminal determines the parameter used in calculating CQI, comprising:
    If said RI fails to exceed $R_T$, the parameters used in calculating CQI include: said RI, PMI selected by said user terminal and PMI reported by said user terminal through PUCCH;
    If said RI exceeds $R_T$, the parameters used in calculating CQI include: said RI, PMI selected by said user terminal and a fixed parameter; the parameter refers to $N_T$×$N_T$, wherein $N_T$ means the number of transmitting antenna of eNB.

7. A user terminal device, including:
    PMI selected cell, which is used to select the codebook used during PMI reported from a second-stage codebook, and select PMI from this codebook; said second-stage codebook includes the codebook displaying long-term/broadband information and the codebook displaying short-term/selective channel frequency information;
    CQI calculation cell, which is used to determine the parameter during CQI calculation and calculate CQI based on this parameter; the determined parameter used during CQI calculation through PUCCH reporting involves PMI reported by said user terminal through PUSCH; during reporting through PUSCH, the determined parameter used for CQI calculation includes PMI reported by said user terminal through PUCCH;
    Reporting cell, which is used to report RI, PMI selected by said PMI selected cell and CQI calculated by said CQI calculation cell based on the specified reporting mode.

8. The user terminal device as claimed in claim 7, wherein, when reporting through PUCCH, said PMI selected cell is applied to select the codebook reflecting long-term/broadband information and the PMI corresponding to precoding matrix applicable to wide band from the selected codebook; and/or, when reporting through PUSCH, select the codebook reflecting short-term/frequency selective channel information, and the PMI corresponding to precoding matrix for reporting cell of each frequency domain subset from the codebook.

9. The user terminal device as claimed in claim 8, wherein, said PMI selected cell is applied to judge whether RI exceeds the set threshold $R_T$ when reporting through PUCCH; if not, select the codebook reflecting long-term/broadband information and the PMI corresponding to precoding matrix applicable to wide band from the codebook; if does, select the codebook reflecting short-term/frequency selective channel information, and the PMI corresponding to precoding matrix applicable to wide band from the codebook; and/or, when reporting through PUSCH, if said RI fails to exceed the set threshold Rt, the dimensionality of the selected precoding matrix is Rt×RI; if said exceeds the set threshold Rt, the dimensionality of selected precoding matrix is $N_r$×RI, wherein $N_r$ refers to the number of transmitting antenna of eNB.

10. The user terminal device as claimed in claim 9, wherein, said PMI selected cell is applied to select the precoding matrix with dimensionality of $N_r$×$R_T$ when RI fails to exceed $R_T$, therein, $N_T$ refers to the number of transmitting antenna of eNB.

11. The user terminal device as claimed in claim 9, wherein, said PMI selected cell is applied to select the precoding matrix with dimensionality of $N_T$×RI when RI exceeds $R_T$, therein, $N_T$ refers to the number of transmitting antenna of eNB.

12. The user terminal device as claimed in claim 7, wherein, said CQI calculation cell is applicable to judge whether said RI exceeds the set threshold $R_T$;

When reporting through PUCCH, if said RI fails to exceed $R_T$, the parameters used in calculating CQI include: said RI, PMI selected by said user terminal and PMI reported by said user terminal through PUSCH; if does, the parameters used in calculating CQI include: said RI, PMI selected by said user terminal and a fixed parameter; the parameter refers to $N_T$×$N_T$, wherein $N_T$ means the number of transmitting antenna of eNB;

And/or,

When reporting through PUSCH, if said RI fails to exceed $R_T$, the parameters used in calculating CQI include: said RI, PMI selected by said user terminal and PMI reported by said user terminal through PUCCH; if does, the parameters used in calculating CQI include: said RI, PMI selected by said user terminal and a fixed parameter; the parameter refers to $N_T$×$N_T$, wherein $N_T$ means the number of transmitting antenna of eNB.

\* \* \* \* \*